(No Model.)

J. H. BURDICK.
NUT.

No. 356,744.      Patented Feb. 1, 1887.

Witnesses:

Inventor:
Justin H. Burdick
By Stout & Underwood
Attorneys.

UNITED STATES PATENT OFFICE.

JUSTIN H. BURDICK, OF UTICA, ASSIGNOR TO THE ELASTIC NUT COMPANY, OF MILWAUKEE, WISCONSIN.

NUT.

SPECIFICATION forming part of Letters Patent No. 356,744, dated February 1, 1887.

Application filed April 17, 1886. Serial No. 199,185. (No model.)

*To all whom it may concern:*

Be it known that I, JUSTIN H. BURDICK, of Utica, in the county of Dane, and in the State of Wisconsin, have invented certain new and useful Improvements in Nuts; and I do hereby declare that the following is a full, clear, and exact description thereof.

My invention relates to nuts; and it consists in certain peculiarities of construction, as will be fully set forth hereinafter.

Figure 1:
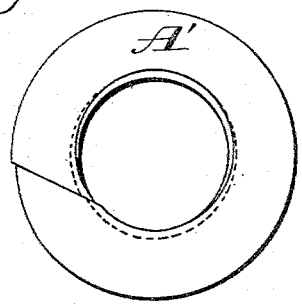
Figure 2:
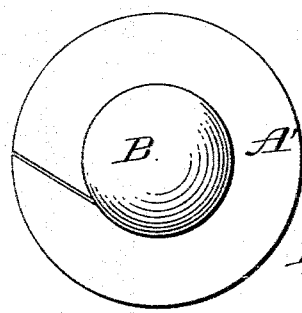
Figure 3:
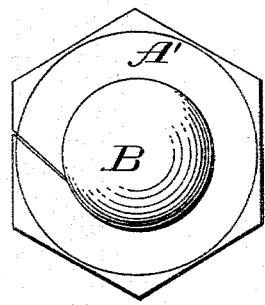
Figure 5:
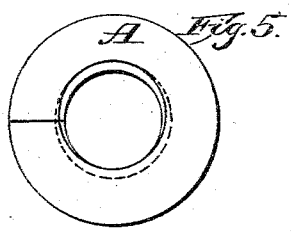
Figures 4, 6:
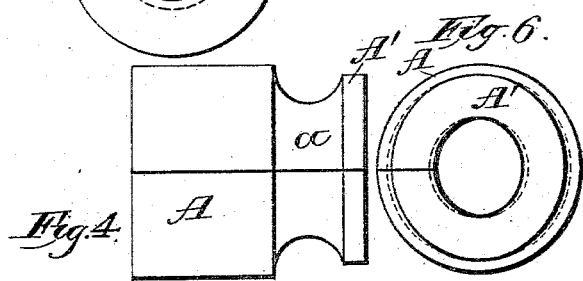

In the drawings, Figure 1 is an end elevation of one form of my invention. Fig. 2 is a similar view of the same upon a bolt. Fig. 3 is an end elevation of another form in place upon a bolt. Fig. 4 is a side elevation, and Figs. 5 and 6 are the two end elevations, of still another form of my device.

My improved nut is preferably made of a steel band or band of other elastic material, the two ends of which are brought together but not welded or joined, thus leaving a slit between the said ends, which slit may be straight, inclined, or irregular. It will be understood, however, that the particular method of making my nut has nothing to do with the present invention, as my device may be made in a variety of ways.

In carrying out my invention I may make my nuts in two ways: First, I may tap the entire nut free for the bolt, and then somewhat flatten one end, so as to render the bore elliptical at said end, or I may thus flatten the whole nut, rendering the entire bore elliptical, the object being in either case to make the nut fit the bolt so tightly that the nut must open slightly in going on, thereby, by reason of its spring or elasticity, causing it to grasp the bolt firmly, and enabling it to adapt itself to slightly varying sizes of bolts and still fit tightly. The nut may be also tapped free, and only a ring on the rear portion of the nut partially separated from the rest of the nut by a deep groove, as shown by Fig. 4, left to grasp the bolt, as stated, this said ring portion being similarly somewhat flattened to render its bore elliptical, so as to grasp the bolt tightly, as described, and be firmly held in place, yet without danger of springing the bolt.

In the several forms of my device illustrated, A represents the forward end of my improved nut, and A' the rear end. B is the bolt.

The first three figures illustrate the simplest form of my device, and either the rear end or the whole nut may be somewhat flattened on opposite sides, causing the bore to become elliptical, as clearly indicated by the full and dotted lines, respectively, in Fig. 6; or one side only of the nut may be somewhat flattened or driven inward, (either at the rear end or throughout the entire nut,) as shown in Fig. 1.

The exterior of my nut may be either round, as shown in Figs. 1 and 2, or polygonal, as in Fig. 3. In Fig. 4 I have shown a groove, $a$, separating the front and rear ends of the nut, the latter being made thinner than the front end and reduced to a mere ring, as such construction will aid the said rear end in springing or separating. Fig. 6 shows the rear end or ring of the form shown in Fig. 4 flattened or rendered elliptical, and Fig. 5 simply illustrates the front end of the form shown in Fig. 4 without any flattening or inward driving.

If desired in any instance, the forward ends of my nuts might even be tapped a little larger than the general diameter of the bore to enable the nuts to readily catch the thread of the bolts.

Having thus fully described my invention, what I claim as new, and desire to secure by Letters Patent, is—

A nut of steel or analogous elastic material formed with a longitudinal slit from one end to the other, and with one or more sides of the nut somewhat flattened or driven inward, whereby the nut in its normal condition has a bore at a variance from a true circle at the point or points where said flattening occurs.

In testimony that I claim the foregoing I have hereunto set my hand at Utica, in the county of Dane and State of Wisconsin, in the presence of two witnesses.

JUSTIN H. BURDICK.

Witnesses:
LEVI KITTILSEN,
HJALMAR L. HAUG.